P. DIETZ.
FLASH LIGHT ATTACHMENT FOR CAMERAS.
APPLICATION FILED OCT. 19, 1912.
1,080,543.
Patented Dec. 9, 1913.
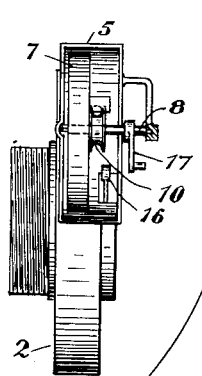
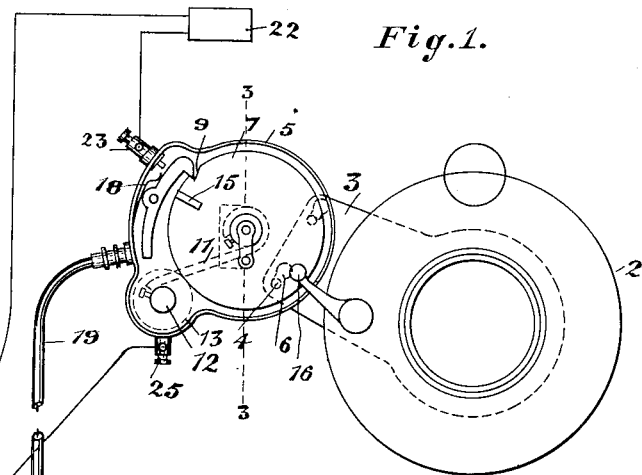
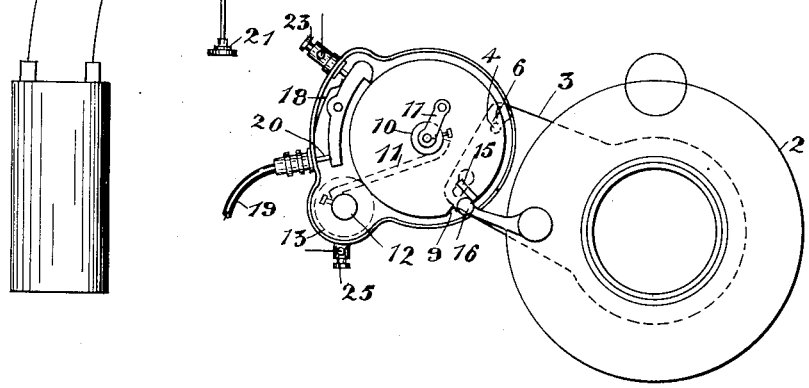
WITNESSES:
INVENTOR
Paul Dietz.
BY
ATTORNEYS

UNITED STATES PATENT OFFICE.

PAUL DIETZ, OF BROOKLYN, NEW YORK, ASSIGNOR, BY MESNE ASSIGNMENTS, TO NEW IDEAS MANUFACTURING COMPANY, OF NEW YORK, N. Y., A CORPORATION OF NEW YORK.

FLASH-LIGHT ATTACHMENT FOR CAMERAS.

1,080,543.  Specification of Letters Patent.  Patented Dec. 9, 1913.

Application filed October 19, 1912. Serial No. 726,644.

*To all whom it may concern:*

Be it known that I, PAUL DIETZ, a subject of the Emperor of Germany, residing at Brooklyn, in the county of Kings and State of New York, have invented certain new and useful Improvements in Flash-Light Attachments for Cameras, of which the following is a specification.

This invention relates to photographic apparatus, and more particularly to a flash-light attachment therefor, the object of the invention being to provide an improved means which will on the operation thereof control the flash-light and also the shutter of the camera in such quick sequence that improved results in the operation of the camera are obtained, the principal object of the present improvement being to provide a simple and quickly operated mechanism which is absolutely reliable and which will overcome the well known defects of apparatus of this general character now on the market.

In the present improvement the device is operated in a mechanical manner by the employment of a positive force generated by a spring. Other attachments of this general nature which are now on the market and which operate by means of an air pump or a liquid pump, or by a spring, are deficient in one or more particulars. When they are operated by a spring, at the time the momentum of the greatest force is required the spring is almost without any tension and can therefore not generate any force. In those devices employing springs it has been found that the tension of the spring is continuously reduced; in other words, the mechanism has its greatest force at the beginning of the operation, while such force decreases during the operation and is weakest when the greatest force is required.

The object sought in the present improvement, therefore, is to obtain the greatest force toward the end of the operation of the parts.

In the drawings accompanying and forming part of this specification, Figure 1 is a front view of this improved attachment showing at the right thereof so much of a camera as is necessary to illustrate the proper operation; Fig. 2 is a substantially similar view with certain details omitted, illustrating a somewhat different position of the parts; and Fig. 3 is a cross sectional view taken in line 3—3, Fig. 1, looking toward the right.

Similar characters of reference indicate corresponding parts in the different figures of the drawings.

In the preferred form thereof shown, the camera 2 is provided adjacent to the lens with a bracket 3, to which the present attachment is secured in any suitable manner, but in the present instance it is fastened thereto by a pair of pins 4 adapted to project into key formed slots 6 carried by the bracket. These pins are carried by a suitable casing 5 inclosing the operating parts of the mechanism. Within this casing a small flywheel or weight 7 is rotatably supported. This wheel is provided with a notch 9. The shaft 8 for this wheel or weight has very thin journals so that the friction is reduced to a minimum. On this shaft, and fixed to or forming a part of the rotatable wheel or weight, is a small grooved roller 10, to which is secured one end of a coiled spring 11, the opposite end of which is secured to a similarly formed grooved roller 12, which is supported by a thumb-nut 13 in such manner that this roller may be released and adjusted and then re-clamped so as to increase the tension on the spring. By the adjustment of this roller the tension of the spring can be regulated.

Carried by the flywheel or weight is a stop or projection 15, which is so located that it will at the proper time strike the arm 16 which operates the shutter. The flywheel or weight is provided with a handle 17 by means of which it may be rotated so as to set the same. Supported by the casing 5 is a detent or pawl adapted to engage the notch 9 and so hold the rotary weight or flywheel in its set position, a suitable spring 18 being located in position to hold this detent in engagement with the notch. For operating this detent a suitable flexible cord or shafting 19 is provided, in which is located a flexible plunger 20 having a button 21 on its end, and on the pressing of this plunger it will engage the free end of the pawl or detent and so shift the same and free it from its notch, whereupon the rotary flywheel or weight will, by means of the spring, rotate and carry the projection into position to shift the shutter arm or lever, the plunger being returned to its normal position by a suitable spring located within the tubing or shafting. The fuse 22 of the flash-light pan or device is electrically connected with a terminal or pole 23 having a contact point which may be adjusted adjacent to the hooked end of the detent, this terminal being carried by the casing. The fuse 22 is also connected with a suitable battery or cell, which in turn is electrically connected with another terminal 25 of the casing.

In operation it will be observed that as soon as the detent is released by pushing the plunger through the medium of its button the first movement of the detent swings it into position to make contact with the terminal 23, so that the fuse is exploded, and as the powder begins to burn,—by reason of the fact that the rotary flywheel or weight has been released it rotates so as to carry the projection into engagement with the shutter operating arm and so operates the shutter. The time difference between the position of rest of the flywheel, in which position the detent is in engagement with the notch, and the moment when the projection strikes the shutter operating lever or arm is the same as the difference in time between the commencement of the burning of the powder and its greatest light capacity. During the rotation of the flywheel weight from its position of rest until it strikes the shutter operating arm or lever which projects through a slot in the casing, the force increases continuously and also the speed of movement of such flywheel, so that it is strongest when the shutter is released, while the tension of the spring grows continuously less. Obviously, in place of a round flywheel disk or weight any other form could be used, and therefore it will be understood that various details could be more or less modified without departing from the spirit or scope of this invention. After the weight has been released it is re-set by means of the handle to bring its notch into engagement with the detent in the manner shown in Fig. 1, the position of the weight when its projection engages the shutter operating arm being that shown in Fig. 2. By means of the present improvement it will therefore be seen that on the first movement of the detent the fuse is exploded and as the flash-light reaches its highest light efficiency the flywheel or weight has rotated into position to operate the shutter, and that by reason of the combined action of the spring and the rotary weight there is more force or power at the end of the rotary movement of the weight than at the beginning to operate the shutter, so that at the time the shutter is operated the greatest force is being exerted thereon, instead of a comparatively weak force as heretofore.

I claim as my invention:

1. The combination with a camera provided with a shutter operating device, of an attachment including a weighted rotary member having a part for engaging and operating said device, means for setting said weighted member, means for holding said weighted member in its set position with its device-engaging part relatively remote from said device thereby to permit the momentum of the rotary member to be increased during its rotary movement, means for releasing said holding means thereby to release the weighted member and permit said part to operate the shutter operating device, and means for imparting a rapid movement to said weighted member thereby to increase the momentum thereof prior to its reaching its device-operating position.

2. The combination with a camera provided with a shutter operating device, of an attachment therefor comprising means for operating a flash-light and for thereafter operating the shutter operating device and including a shiftable weighted member, means for shifting said weighted member, and a device for holding said weighted member in its set position and effective on the release of said weighted member to effect the ignition of the flash-light prior to the release of the shutter.

3. The combination with a camera provided with a shutter operating device, of an attachment therefor comprising means for operating a flash-light and for thereafter operating the shutter operating device and including a spring-actuated weighted member, and a device for holding said weighted member in its set position and effective on the release of said weighted member to effect the ignition of the flash-light prior to the release of the shutter.

4. The combination with a camera provided with a shutter operating device, of an attachment therefor comprising means for operating a flash-light and for thereafter operating the shutter operating device and including a spring-actuated rotary weighted member, means for setting said member, manually controlled means for releasing said member, and a device for holding said weighted member in its set position and effective on the release of said weighted member to effect the ignition of the flash-light prior to the release of the shutter.

5. The combination with a camera provided with a shutter operating device, of an attachment including a rotary weighted member having a part for engaging and operating said device, manually operative means for setting said weighted member, means for holding said weighted member in its set position with its device-engaging part relatively remote from said device thereby to permit the momentum of the rotary member to be increased during its rotary movement; manually operative means for releasing said holding means thereby to release the weighted member and permit the same to operate the shutter operating device, and a spring for imparting a rapid movement to said weighted member thereby to increase the momentum thereof prior to its reaching its device-operating position.

6. The combination with a camera provided with a shutter operating device, of an attachment therefor comprising electrical means for igniting a flash-light and means for thereafter operating the shutter operating device and including a shiftable weighted member, means for shifting said weighted member, a device for holding said weighted member in its set position and effective on the release of said weighted member to effect an electrical contact thereby to effect the ignition of the flash-light prior to the release of the shutter.

7. The combination with a camera provided with a shutter operating device, of an attachment therefor comprising electrical means for igniting a flash-light and means for thereafter operating the shutter operating device and including a spring-actuated weighted member, a device for holding said weighted member in its set position and effective on the release of said weighted member to effect an electrical contact thereby to effect the ignition of the flash-light prior to the release of the shutter.

8. The combination with a camera provided with a shutter operating device, of an attachment therefor comprising electrical means for igniting a flash-light and means for thereafter operating the shutter operating device and including a rotary weighted member, means for rotating it, a device for holding said weighted member in its set position and effective on the release of said weighted member to effect an electrical contact thereby to effect the ignition of the flash-light prior to the release of the shutter.

9. The combination with a camera provided with a shutter operating device, of an attachment therefor comprising electrical means for igniting a flash-light and means for thereafter operating the shutter operating device and including a spring-actuated rotary weighted member, a device for holding said weighted member in its set position and effective on the release of said weighted member to effect an electrical contact thereby to effect the ignition of the flash-light prior to the release of the shutter.

10. The combination with a camera provided with a shutter operating device, of an attachment therefor comprising means for operating a flash-light and for thereafter operating the shutter operating device and including a shiftable weighted member, means for shifting said weighted member, means for setting said member and means for holding it in its set position, said last means effective on the release thereof from its holding position to effect an electrical contact thereby to effect the ignition of the flash-light prior to releasing the shutter.

11. The combination with a camera provided with a shutter operating device, of an attachment therefor comprising means for operating a flash-light and for thereafter operating the shutter operating device and including a spring-actuated weighted member, means for setting said member and means for holding it in its set position, said last means effective on the release thereof from its holding position to effect an electrical contact thereby to effect the ignition of the flash-light prior to releasing the shutter.

12. The combination with a camera provided with a shutter operating device, of an attachment therefor comprising means for operating a flash-light and for thereafter operating the shutter operating device and including a rotary weighted member, means for rotating said weighted member, means for setting said member and means for holding it in its set position, said last means effective on the release thereof from its holding position to effect an electrical contact thereby to effect the ignition of the flash-light prior to releasing the shutter.

13. The combination with a camera provided with a shutter operating device, of an attachment therefor comprising means for operating a flash-light and for thereafter operating the shutter operating device and including a spring-actuated rotary weighted member, means for setting said member, means for holding it in its set position, said last means effective on the release thereof from its holding position to effect an electrical contact thereby to effect the ignition of the flash-light prior to the release of the shutter, and means for manually releasing said holding means.

14. The combination with a camera provided with a shutter operating device, of an attachment therefor comprising a casing, a pair of terminals on said casing for electric connection to a flash-light, a rotary weighted member within said casing and provided with a notch, a spring connected to said member, a pivotally supported detent for engagement with said notch and shiftable into position for engaging one of said terminals, manually controlled means for operating said detent thereby to make connection with one of said terminals, and means carried by said weighted member and effective on the rotation thereof to engage the shutter operating device.

15. The combination with a camera provided with a shutter operating device, of an attachment therefor comprising means for closing an electrical circuit to operate a flash-light device, means for actuating said shutter-operating device including a spring-actuated rotary weighted member, means for tensioning the spring and setting said rotary member, means for holding the rotary member in its set position, said last means being also included in the circuit closing means and effective on its release from its holding position to effect an electrical contact thereby effecting the ignition of the flash-light prior to releasing the shutter.

16. The combination with a camera provided with a shutter operating device, of an attachment therefor comprising a casing, a pair of terminals on said casing for electric connection to a flash-light, a rotary weighted member within said casing and provided with a notch, a coiled spring connected to said member, a pivotally supported detent for engagement with said notch and shiftable into position for engaging one of said terminals, manually controlled means for operating said detent thereby to make connection with one of said terminals, means carried by said weighted member and effective on the rotation thereof to engage the shutter operating device, means for adjusting said coiled spring, and means for re-setting said weighted member.

17. The combination with a camera provided with a shutter operating device, of an attachment therefor comprising means for operating a flash-light and spring-actuated weighted means having a part for engaging and operating the shutter operating device and normally located relatively remote from said shutter operating device, said weighted means having greater momentum at the end of its movement than at the commencement thereof.

18. The combination with a camera provided with a shutter operating device, of an attachment therefor comprising electrical means for igniting a flash-light and means for thereafter operating the shutter operating device and including spring-actuated weighted means having a part for engaging said shutter operating device and normally located relatively remote therefrom, said weighted means having greater momentum at the end of its movement than at the commencement thereof.

19. The combination with a camera provided with a shutter operating device, of an attachment therefor comprising means for operating a flash-light and the shutter operating device, said means consisting of a spring-actuated rotary weighted member having a projection adapted to engage the shutter operating device and a notch, a shiftable holding member adapted to engage said notch, and manually controlled means for shifting said holding member thereby to effect electrical connection to operate the flash-light and release the weighted member, the weighted member and spring being so organized that the momentum of the weighted member increases during its rotation while the tension of the spring decreases.

20. An attachment for cameras comprising a casing, a spring-actuated rotary weighted member mounted therein and having a projection and a notch, a pivoted detent for engaging said notch on the setting of said weighted member, an electrically connected flash-light device connected with said casing and having a terminal in position to be engaged by said detent, and means for manually operating said detent to complete the electrical circuit and release said weighted member.

21. An attachment for cameras comprising a casing, a spring-actuated rotary weighted member mounted therein and having a projection and a notch, a pivoted detent for engaging said notch on the setting of said weighted member, an electrically connected flash-light device connected with said casing and having a terminal in position to be engaged by said detent, and means for manually operating said detent to complete the electrical circuit and release said weighted member, the organization of said weighted member and its operating spring being such that the operating force of the member is increased during its rotation while the tension of the spring is decreased.

22. The combination with a camera provided with a shutter operating device, of an attachment therefor including a rotary weighted disk having a part for engaging and operating said device, manually operative means for setting said weighted disk, said disk having a notch, a pivoted detent for engaging said notch and holding the disk in its set position with its device-operating part at a distance from said device, manually operative means for releasing said detent thereby to release the disk and permit said part to operate the shutter operating device, and a spring for imparting a rapid movement to said disk sufficient to increase the momentum thereof during the rotary movement of the disk.

23. A camera provided with a shutter operating device, means for operating said device, an instrumentality for actuating said means, a different means for closing a flash-light igniting circuit prior to the operation of said shutter, and means for actuating said circuit closing means whereby the flash-light and shutter will commence to operate in sequence, said circuit-closing means constituting the means for holding said first means in its set position.

24. A camera provided with a shutter operating member, spring-actuated rotary weighted means for operating said member, a different means for closing a flash-light ignition circuit prior to the operation of said shutter, said circuit closing means constituting the means for holding said weighted means in its set position, and means for operating said circuit closing means whereby the flash-light and shutter will commence to operate in sequence.

25. A camera provided with a shutter operating member, spring-actuated rotary weighted means for operating said member, means for closing a flash-light igniting circuit prior to the operation of said shutter, said circuit closing means constituting the means for holding said weighted means in its set position, said weighted means having a projection located relatively remote from the shutter operating member when said weighted means is in its set position and movable into position to engage said shutter operating member when it is released by the circuit closing means, and means for operating said circuit closing means whereby the flash-light and shutter will commence to operate in sequence.

Signed at 1821 Park Row Building, New York, N. Y., this 18th day of October, 1912.

PAUL DIETZ.

Witnesses:
C. A. WEED,
F. E. BOYCE.